United States Patent [19]

Tromeur

[11] Patent Number: 5,189,286
[45] Date of Patent: Feb. 23, 1993

[54] ODOMETER WHEEL WITH FRANGIBLE SPOKES

[76] Inventor: Robert L. Tromeur, 18632 Doty, Mt. Clemens, Mich. 48043

[21] Appl. No.: 793,963

[22] Filed: Nov. 18, 1991

[51] Int. Cl.$^5$ ............................................. G01C 22/00
[52] U.S. Cl. .................................... 235/95 R; 235/96
[58] Field of Search .................... 235/95 R, 96, 139 A

[56] References Cited

U.S. PATENT DOCUMENTS

| | | | |
|---|---|---|---|
| 3,482,773 | 12/1969 | Hachtel | 235/95 R |
| 3,636,320 | 1/1972 | Wallis | 235/95 R |
| 3,785,551 | 1/1974 | Regan | 235/95 R |
| 3,801,005 | 4/1974 | Pniewski | 235/95 R |
| 3,949,201 | 4/1976 | Bogart | 235/95 R |
| 4,267,438 | 5/1981 | Regar | 235/96 |
| 4,284,882 | 8/1981 | Woodward | 235/139 R |

Primary Examiner—Michael L. Gellner
Assistant Examiner—Eddie C. Lee
Attorney, Agent, or Firm—Kenneth H. MacLean

[57] ABSTRACT

An odometer type device for recording mileage and changes therein in a vehicle or the like, including a plurality of mileage indicating wheels placed on a shaft for rotation, each wheel being in closely spaced relationship to one another. The wheels each have a hub portion, an outer rim portion and integral spokes connecting the hub and rim portions. The spokes have a thinned midportion sufficiently weak so as to separate and disconnect the hub and rim portions to defeat attempts to move one wheel axially away from an adjacent wheel by imposing a significant axially directed prying force on the rim.

4 Claims, 1 Drawing Sheet

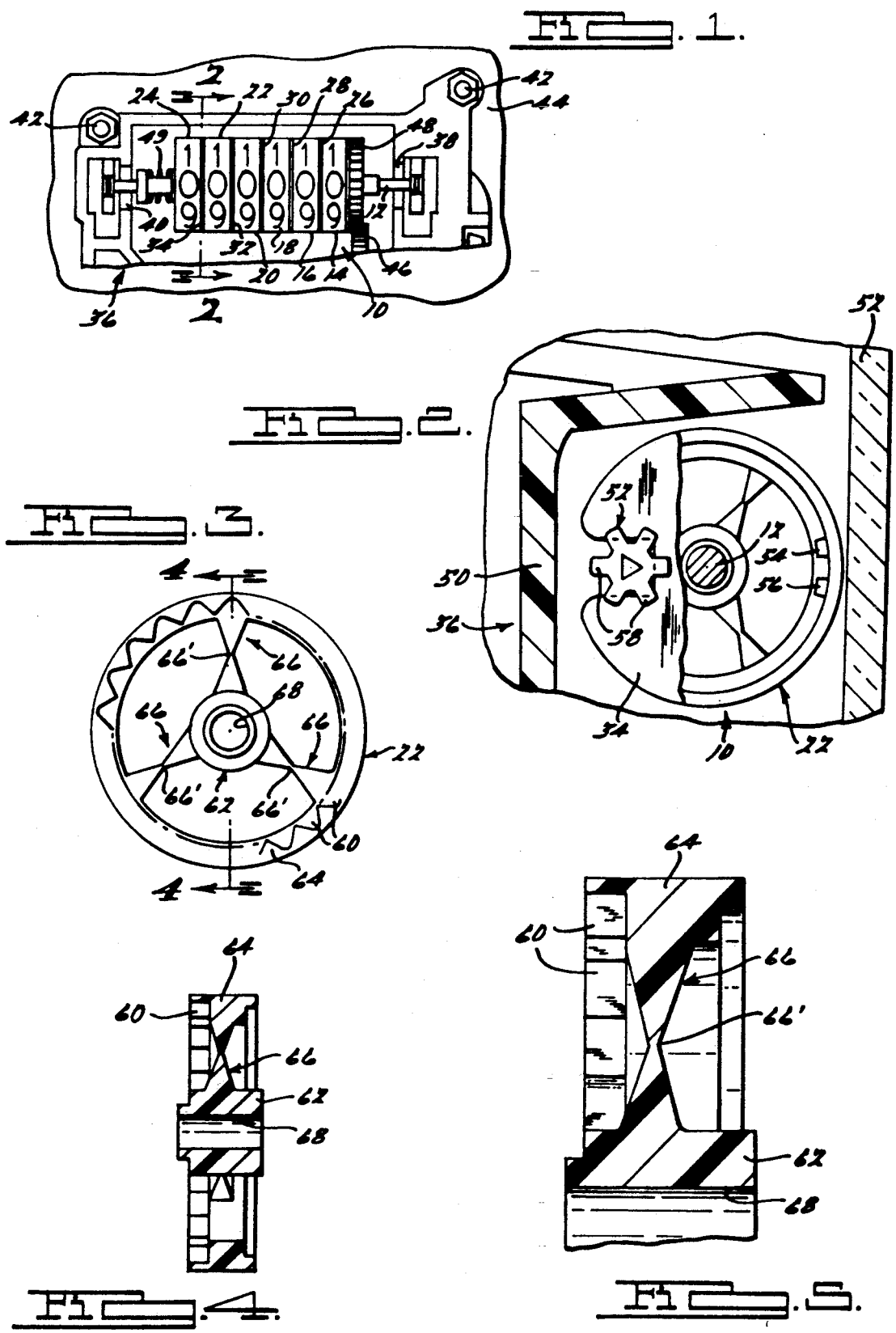

ODOMETER WHEEL WITH FRANGIBLE SPOKES

BACKGROUND OF THE INVENTION

1. Field of the Invention

This application concerns a mileage recording odometer device with a plurality of digit wheels mounted in close side by side relationship on a shaft. Each digit wheel has a hub portion encircling the shaft and an outer rim portion bearing mileage indicia thereon. Several spokes connect the hub and the rim portions and are formed integrally with the hub and rim. The improvement resides in the configuration of the spokes whose cross section of a spoke progressively decreases toward the midportion so that it the spoke is frangible in resonse to a significant axially directed prying force on the rim portion of the wheel.

2. Description of Related Art

There have been earlier attempts to prevent odometer tampering. The U.S. Pat. No. 3,949,201 utilizes an obliterating means to destroy the mileage indicia on the outer surface of the wheels whenever the a wheel is rotated in a reverse direction to decrease mileage indication. In U.S. Pat. No. 3,636,320, a drive or input mechanism operates only to advance the indicia wheels and resists reverse rotation of the wheels. Likewise, U.S. Pat. No. 3,785,551 provides a transfer mechanism between the wheels to prevents their reverse rotation.

The U.S. Pat. No. 3,482,773 discloses a transfer mechanism between each wheel including a strap member secured in one position during normal odometer operation. The strap is designed to break or become unsecured when an attempt is made to rotate the wheel in a reverse direction by "picking."

The U.S. Pat. No. 4,284,882 discloses an odometer having a transfer mechanism between odomeeeter wheels mounted on a shaft having a weakened portion adapted to break when an attempt is made to rotate the wheels in a reverse direction. Likewise, the U.S. Pat. No. 4,267,438 discloses an odometer with wheels mounted on a shaft having notches therein to weaken the shaft so that the shaft breaks if significant prying is attempted. Also, the wheels include radially extending grooves designed to cause the wheel to break in the radial direction or into sectors upon application of a prying force.

SUMMARY OF THE INVENTION

This application discloses an improved digit wheel for an odometer which includes a hub portion, an outwardly spaced rim portion and integrally formed spokes connecting the hub and rim. The spoke configuration is intended to provide adequate integrity between the hub and rim during normal odometer operation but to separate at a midportion in response to bending of the rim relative to the hub during tampering by insertion of a tool between the digit wheels. Specifically, the spoke has a relatively large cross section adjacent the hub and the rim but the cross section progressively decreases toward a midportion. At the midportion, the spoke is just sufficiently strong to transmit normal forces between the hub and rim during operation of the odometer but insufficient to resist breaking when axially directed bending forces are imposed on the rim portion with the intention of moving a wheel away from an adjacent wheel. After the midportion is broken, the rim portion is visually misaligned with respect to the hub portion and a plane normal to the shaft axis.

Therefore, an object or advantage of this improved frangible odometer wheel is that the broken wheel is visibly misaligned after a tampering attempt.

Another advantage o the subject improved frangible odometer wheel is that the spoke is configured with the weakest part at a midportion so that a considerable bending moment is generated at the midportion by even a small prying force.

Still further objects and advantages of the subject improved frangible odometer wheel will be more apparent by reference to the following detailed description of an embodiment, reference being made to the drawings thereof, described hereafter.

IN THE DRAWING

FIG. 1 is a elevational view of an odometer assembly from a vehicle operator's view point; and FIG. 2 is a sectioned elevational end view of the odometer and a wheel thereof taken along section line 2—2 in FIG. 1 and looking in the direction of the arrows; and FIG. 3 is an elevational view of the opposite end of the odometer wheel shown in FIG. 2; and FIG. 4 is a sectioned view of the odometer wheel taken along section line 4—4 in FIG. 3 and looking in the direction of the arrows; and FIG. 5 is a partial and enlarged sectioned view of the spoke portion of the odometer wheel shown in FIG. 4.

DETAILED DESCRIPTION OF A PREFERRED EMBODIMENT

In FIGS. 1 and 2, an odometer assembly 10 is illustrated. Assembly 10 includes a shaft 12 and several digit wheels 12, 14, 16, 18, 20, 22, and 24 rotatively supported on the shaft for displaying mileage. As is common in the odometer art, digit wheel 12 may display tenths of a mile, wheel 14 may display single miles, wheel 16 may display tens of miles, wheel 18 may display hundreds of miles, wheel 20 may display thousands of miles, wheel 22 may display ten thousands of miles and wheel 24 may display one hundred thousands of miles.

The digit wheels 14-24 are separated by thin partition plate members 26, 28, 30, 32 and 34. The shaft 12 is supported at its end portions by a frame assembly 36 which includes mount portion 38 for the right end of the shaft and mount portion 40 for the left end of the shaft. Fasteners 42 secure the frame assembly 36 to an instrument panel structure 44.

At the shaft's right end, a rotatable drive gear 46 meshes with an input gear 48 rotatably mounted on shaft 12. The drive gear 46 rotates in correspondence with vehicle movement and rotates the input gear 48. Rotation of gear 48 in turn advances the tenth mile digit wheel 14. In turn, the other wheels 16, 18, 20, 22 and 24 are progressively rotated in the manner known to vehicle odometers and shown in FIG. 2 and further explained in the above identified U.S. Patents.

At the left end of the shaft 12, the axial positioning of the wheels is established by a spring 49 which engages a central hub portion of the digit wheel 24. The spring 49 urges the wheels to the right on the shaft.

In FIG. 2, digit wheel 22 and partition plate member 34 are illustrated on shaft 12. The wheel and plate member are spaced away from a back wall 50 of frame assembly 36. A transparent lens or window 52 covers the assembly and allows a vehicle operator to view the digit wheels. In FIG. 2, the transfer mechanism, a pinion gear 52 is shown. The pinion gear 52 effects rotation of one digit wheel such as wheel 24 in response to rotation of an adjacent digit wheel such as wheel 22. Pinion gear 52 is supported for rotation by partition plate 34 Resultantly, when the digit wheel 22 rotates one revolution, two internal gear teeth 54, 56 internal to the wheel 22 engage teeth (not visible) of the pinion gear 52, causing it to rotate. This rotation of pinion gear 52 causes teeth 58 of the pinion gear 52 to mesh with internal teeth 60 of wheel 24 (see FIG. 3) and rotate the adjacent digit wheel 24 one tenth of a complete rotation or 36 degrees. A similar transfer apparatus is explained and illustrated in the above identified U.S. Pat. No. 3,785,551 and thus is well known in the odometer art.

Referring specifically to the odometer structure of FIG. 1, a method of altering or tampering with odometers to turn back mileage is to insert a tool between the digit wheels and apply an axially directed (relative to shaft 12) force on its rim portion. Specifically, the tool might be inserted between digit wheel 24 and partition plate member 34 so that a leftward directed force is imposed on the outer rim of wheel 24 so that the rim is bent to the left. Thus the rim of the wheel 24 could be moved far enough to the left so that its internal teeth 60 do not mesh with the teeth 58 of the pinion gear. In this manner, the digit wheel can be moved to a new position showing less mileage.

Referring to FIGS. 3-5, details of the subject improved digit wheel are illustrated by views of wheel 22. Wheel 22 includes a central hub portion 62, an outer rim portion 64 and three spoke portions 66. The hub portion 62 has a cylindrical configuration with a central aperture 68 therethrough for passage of the shaft 12. The rim portion 64 has a cylindrical surface on which mileage indicia is carried as shown in FIG. 1. On the interior side of the rim portion 64 are the two teeth 54, 56 formed at one side and the continuous internal teeth 60 formed at the opposite side of the rim. The hub and rim portions are interconnected by three spokes 66 which are molded integrally with the hub and rim portions.

Each spoke has a substantial cross-sectional area adjacent the hub portion 62 and the rim portion 64. In FIG. 5, it can be seen that the decrease in the spoke's width reduces the cross sectional area of the spoke 66 progressively toward a midportion 66' of the spoke. Correspondingly, with reference to FIG. 3, it is noted that a reduction in the thickness of the spoke (in a circumferential direction) contributes to the decrease in the cross sectional area toward the midportion 66'. At midportion 66' the area is so decreased as to be inadequate to prevent breakage when the wheel is subject to prying forces. These prying forces imposed on the rim portion 64 produce a bending moment across the spoke between the hub and the rim which overcomes the strength of the decreased cross section of midportion 66' resulting in separation between the inner and outer portions of the spoke. This also results in a visible misalignment of the rim portion from the plane of the hub about the shaft.

Although only a single embodiment of the improved digit wheel and odometer has been illustrated and described in detail, modifications are contemplated which would still be defined by the following claims which define the invention.

What is claimed is as follows:

1. In a mileage recording odometer including a shaft having a plurality of cylindrical digit wheels closely space thereon in side by side relationship to one another, an improved digit wheel, comprising: the digit wheel having a central hub portion, an outer rim portion and frangible connecting spokes therebetween responsive by breaking to prying of the rim portion relative to the hub portion; the hub portion having a central aperture through which the shaft extends; the hub, rim and spoke portions being integrally mold formed; the cross sectional area of the spoke being greater adjacent the hub and rim portions and progressively decreasing toward a narrow midportion so that any significant axially directed prying force on the rim portion generates a sufficient bending stress on the narrow midportion resulting in breakage of the spoke portion resulting in visual misalignment of the rim portion relative to the hub.

2. In a mileage recording odometer including a shaft having a plurality of cylindrical digit wheels closely spaced thereon in side by side relationship to one another, an improved digit wheel, comprising: the digit wheel having a central hub portion, an outer rim portion and frangible connecting spokes therebetween responsive by breaking to prying of the rim portion relative to the hub portion; the hub portion having a central aperture through which the shaft extends; the hub, rim and spoke portions being integrally mold formed of elastomeric material; the cross sectional area of the spoke being greater adjacent the hub and rim portions and progressively decreasing toward a narrow midportion so that any significant axially directed prying force on the rim portion generates a sufficient bending stress on the arrow midportion resulting in breakage of the spoke portion resulting in visual misalignment of the rim portion relative to the hub, the reduction in cross sectional area reduced by progressively decreasing the spoke width from a relatively large dimension adjacent the hub and the rim to a small dimension at the midportion.

3. In a mileage recording odometer including a shaft having a plurality of cylindrical digit wheels closely spaced thereon in side by side relationship to one another, an improved digit wheel, comprising: the digit wheel having a central hub portion, an outer rim portion and frangible connecting spokes therebetween responsive by breaking to prying of the rim portion relative to the hub portion; the hub portion having a central aperture through which the shaft extends; the hub, rim and spoke portions being integrally mold formed of elastomeric material; the cross sectional area of the spoke being greater adjacent the hub and rim portions and progressively decreasing toward a narrow midportion so that any significant axially directed prying force on the rim portion generates a sufficient bending stress on the narrow midportion resulting in breakage of the spoke portion resulting in visual misalignment of the rim portion relative to the hub, the decrease in cross sectional area is reduced by progressively decreasing the spoke thickness measured in the circumferential direction from a relatively large dimension adjacent the hub and the rim to a small dimension at the midportion.

4. In the mileage recording odometer set forth in claim 3 in which the decrease in cross sectional area is also reduced by progressively decreasing the spoke width from a relatively large dimension adjacent the hub and the rim to a small dimension at the midportion.

* * * * *

UNITED STATES PATENT AND TRADEMARK OFFICE
CERTIFICATE OF CORRECTION

PATENT NO. : 5,189,286
DATED : February 23, 1993
INVENTOR(S) : Tromeur

It is certified that error appears in the above-indentified patent and that said Letters Patent is hereby corrected as shown below:

ON THE TITLE PAGE, in Assignee item #73, insert --Chrysler Corporation--

Signed and Sealed this

Fifth Day of July, 1994

Attest:

BRUCE LEHMAN

Attesting Officer     Commissioner of Patents and Trademarks